Figure 1:
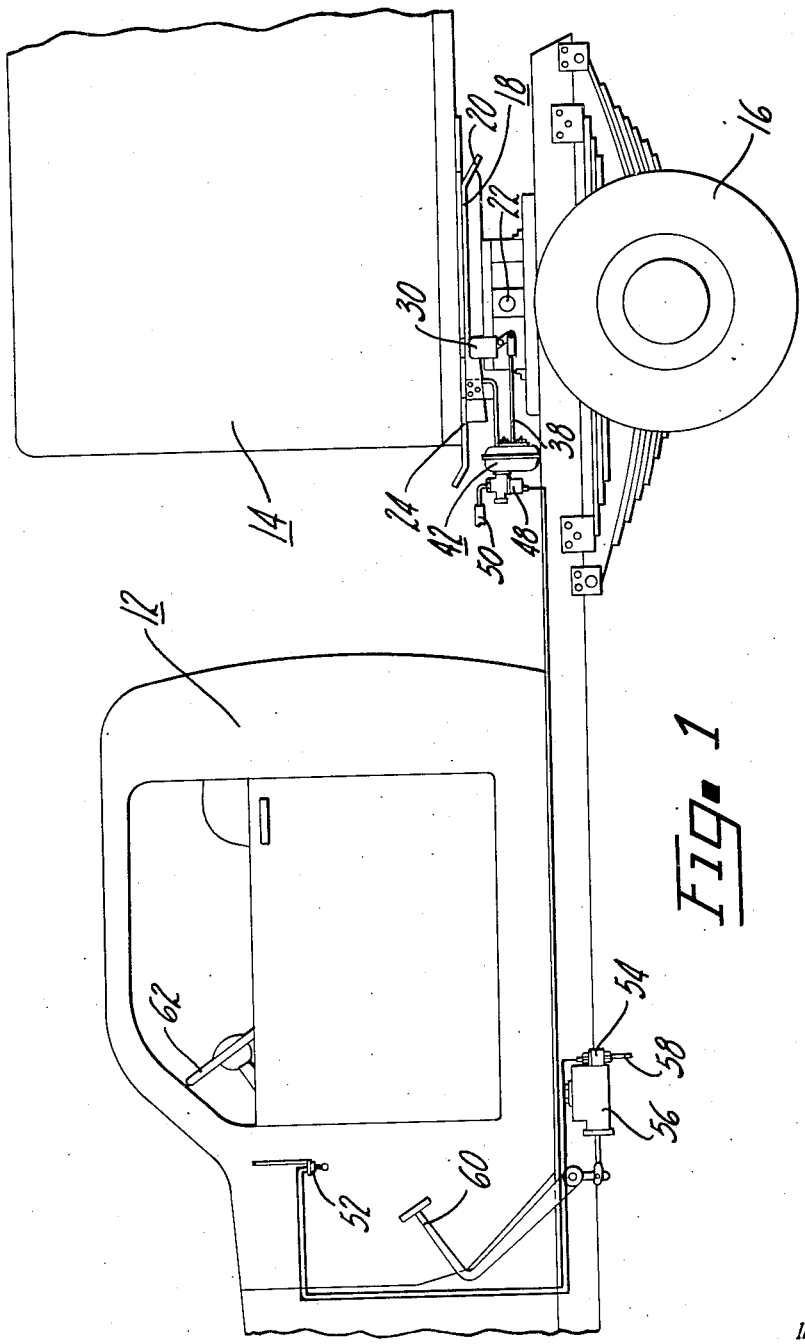

April 26, 1949.  E. R. PRICE  2,468,705
ANTIJACKKNIFE DEVICE

Original Filed Aug. 11, 1944                         2 Sheets-Sheet 1

INVENTOR
EARL R. PRICE
BY
T. J. Plante
ATTORNEY

April 26, 1949.   E. R. PRICE   2,468,705
ANTIJACKKNIFE DEVICE

Original Filed Aug. 11, 1944   2 Sheets-Sheet 2

INVENTOR
EARL R. PRICE
BY T. J. Plante
ATTORNEY

Patented Apr. 26, 1949

2,468,705

UNITED STATES PATENT OFFICE 2,468,705

ANTIJACKKNIFE DEVICE

Earl R. Price, South Bend, Ind., assignor to Bendix Aviation Corporation, South Bend, Ind., a corporation of Delaware Continuation of application Serial No. 548,998, August 11, 1944. This application July 2, 1947, Serial No. 758,669

10 Claims. (Cl. 280—33.05)

1

This invention relates to tractor-trailer vehicle combinations. The primary object of the invention is to prevent "jackknifing" of such tractor and trailer combinations. The present application is a continuation of application Serial No. 548,998, filed August 11, 1944, now abandoned.

"Jackknifing" is the undesired swinging of either of the tractor or trailer to one side of the proper line of motion of the vehicle train, the two vehicles closing upon one another as the blades of a jackknife. It is most likely to occur when the trailer is of the semi-trailer type, having rear wheels only, and supported at the front by a fifth wheel on the tractor.

"Jackknifing" is almost invariably caused by skidding of wheels on either the tractor or trailer or on both vehicles. As long as the wheels are rolling, the vehicles tend to move in the proper direction, but when the wheels begin to slide, they can move as easily in any other direction as they can move straight ahead. Consequently, when a slight turning or swinging movement of one of the vehicles relative to the other occurs, it is easy for such swinging movement to continue until the entire unit is out of control. The farther out-of-line the swinging vehicle gets, the harder it is to pull it back into line, since the fore-and-aft axis of its wheels is at a greater angle of inclination with respect to the direction of movement of the train, and its wheels are therefore less likely to resume normal rotation.

Heretofore, the approach to the "jackknifing" problem has been to either increase the effectiveness of the trailer brakes or to provide means for applying the trailer brakes quickly, without the usual time lag due to long connecting lines. Presumably, the theory has been that, because apparently the trailer usually causes "jackknifing" by running upon the tractor, the problem could be solved by having the trailer, during deceleration, "pulling back" on the tractor, rather than having the tractor "pushing back" on the trailer. To accomplish this seems a practical impossibility since the tractor brakes invariably have an effectiveness in excess of that required to merely decelerate the relatively light tractor vehicle, and therefore the tractor brakes assist the trailer brakes in stopping the trailer, the tractor pushing back on the kingpin which connects the vehicles.

I propose to provide means which act directly and positively to prevent or restrict undesired turning or swinging movement of one of the vehicles relative to the other (i. e. "jackknifing").

Other objects, advantages, and important features of the present invention will become apparent during the course of the following description, reference being had therein to the accompanying drawings, in which.

Figure 4:
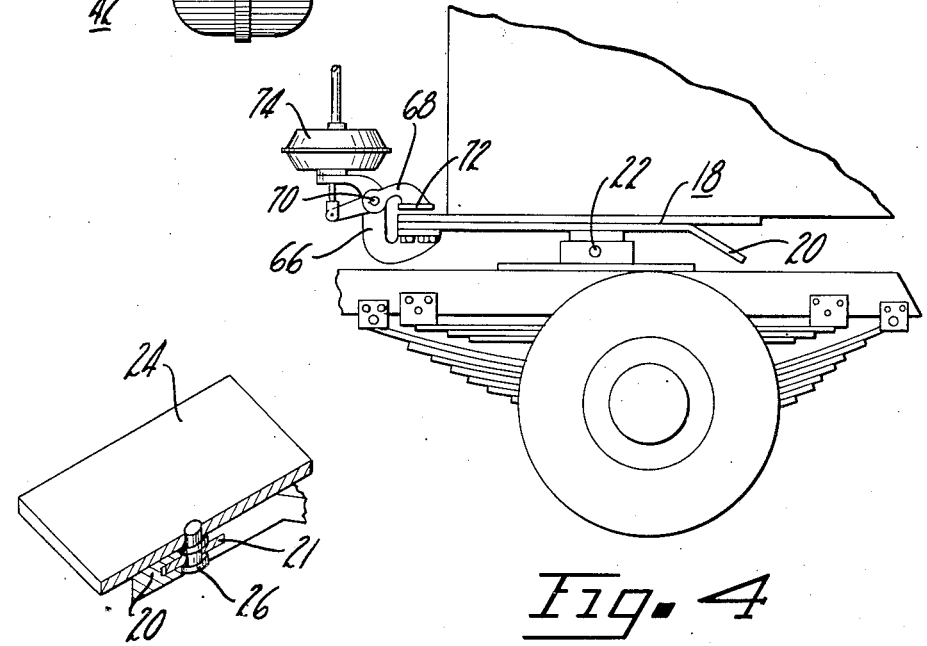
Figure 3:
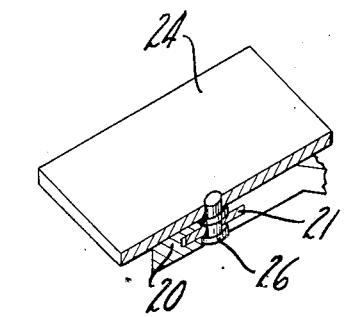

Figure 1 is a diagrammatic view showing my invention applied to a tractor-trailer vehicle combination;

Fiugre 2 is a close up of a portion of the device shown in Figure 1;

Figure 3 is a perspective showing the upper and lower fifth wheel plates and the kingpin in locked relationship with the lower fifth wheel plate; and Figure 4 is a diagrammatic showing of a modified arrangement.

Referring to Figure 1, a tractor vehicle is shown at 12 and the front end of a trailer vehicle is shown at 14. In the illustrated arrangement, the tractor has front wheels (not shown), and rear wheels 16, and the trailer has rear wheels only (not shown). The front end of the trailer is supported on the rear of the tractor by means of the usual fifth wheel arrangement, indicated generally at 18. The structure of the fifth wheel, may, in general, be conventional. The lower fifth wheel plate 20, which is supported on the tractor, is preferably mounted on the cross-shaft 22, which permits movement of the lower fifth wheel plate when the vehicle train moves over a bump and the inclination of one vehicle momentarily changes with respect to the other. The upper fifth wheel plate 24 is mounted on the trailer, and the spool-shaped kingpin 26 (see Figure 3) extends from the upper fifth wheel plate 24 into an opening in the lower fifth wheel plate 20, in which it is locked against either relative upward or relative lengthwise movement by a spring loaded automatic locking plate 21 retained in the lower fifth wheel plate 20, the kingpin serving to transmit the motive force between the tractor and trailer while serving as a pivot for relative turning movement of the tractor and trailer. During such turning movement the upper fifth wheel plate slides on the lower fifth wheel plate.

Figure 2:
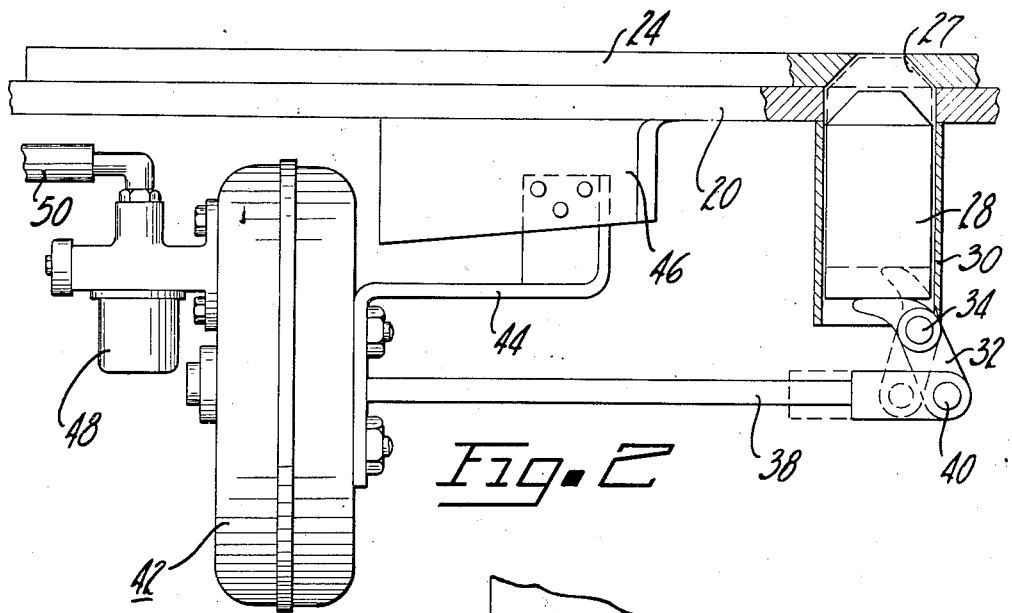

The structure thus far described is conventional. I propose to provide means for at times resisting relative turning movement between the tractor and trailer, in order to prevent jackknifing. The upper fifth wheel plate 24 may be provided with an opening or depression 27 (see closeup in Figure 2). The lower fifth wheel plate 20 may support a plunger or latch 28 adapted at times to move into the opening 27 and thereby resist turning of the upper and lower fifth wheel plates relative to one another. In the drawings, the plunger 28 is shown reciprocable in a tube 30 depending from the lower fifth wheel plate. The means for moving the plunger may comprise a lever 32 pivoted at 34 and having a portion 36 engaging the lower end of the plunger, and a rod 38 pivotally connected to the lever 32 at 40, and adapted to be actuated by the pressure responsive member (piston or diaphragm) of a power device 42. The power device 42 may be supported on a bracket 44, which in turn may be mounted on a flange 46 of the lower fifth wheel plate. In place of power device 42, a direct manual control for the plunger 28 might be provided.

Control of the power device 42 may be accomplished in any desired manner. In the illustrated device, a solenoid valve is used. This valve is illustrated in outline at 48, and comprises a valve member which either connects or disconnects the left side of power device 42 from a pipe 50 leading to a positive or negative pressure source, such as the usual intake manifold, which develops a vacuum. The valve member of the solenoid valve is controlled by the usual solenoid armature, which in turn is regulated by a coil in an electric circuit. The electric circuit, in addition to the solenoid, may include a manually operable switch 52 and an automatically operable switch, such as the stoplight switch 54.

The tractor 12 has the usual brake operating system, which may include a master cylinder 56 connected to the brakes by conduit 58, and actuated by a pedal 60. The tractor also has the usual steering mechanism controlled by a steering wheel 62.

Operation of the device for preventing jackknifing is as follows. Assuming the manually operable switch 52 is closed, actuation of the brakes completes the electric circuit by closing the stoplight switch 54. The solenoid is energized to move the solenoid armature and thereby permit communication, heretofore prevented, between the vacuum source and the left end of power device 42. This draws the rod 38 to the left, exerting a force tending to move the lever 32 and plunger 28 into the dotted line position shown in Figure 2. Assuming the plunger 28 is in alignment with opening 27, it will be free to move into the dotted line position shown. The arrangement is such that the plunger is aligned with the opening when the tractor and trailer are in a substantially straight line. The angle through which one of the vehicles would have to move away from the straight line position in order to prevent engagement of the plunger 28 in the opening 27 is a matter of choice. Preferably, at least a few degrees of latitude are allowed.

In the engaged position, the plunger 28 tends to prevent relative rotation of the upper and lower fifth wheel plates, and thereby tends to prevent relative turning movement of the tractor and trailer about the kingpin 26. Thus any tendency of the vehicle to jackknife is opposed by positively acting means which acts in a direct way to prevent the relative swinging movement associated with jacknifing.

It is not intended that the plunger 28 lock the fifth wheel plates together with such force that they cannot move relatively to one another when the operator wishes to turn the vehicle train. To this end I have provided complementary tapering surfaces on the inside of opening 27 and on the upper end 64 of the plunger 28, in order that the surface of opening 27 may act as a cam in forcing plunger 28 out of engagement when sufficient force is developed.

The force holding plunger 28 in engagement with the upper fifth wheel plate will depend upon several things, among them the pressure exerted by the device 42, the leverage ratio of the mechanism between the power device and the plunger, the angle of taper of the surfaces 64 and 27, and the lever arm or radial distance between the opening 27 and the kingpin 26. The arrangement must, of course, be such that force created by turning the steering mechanism of the tractor will overcome the force tending to hold plunger 28 in engaged position, and will move the plunger downwardly to permit relative turning movement of the upper and lower fifth wheel plates. The force against the plunger created by turning the steering mechanism of the tractor is large, and is much greater than that required to prevent jackknifing.

This is true because any tendency of the vehicles to jackknife is relatively weak so long as the angle of movement is slight. By exerting a force tending to hold the tractor and trailer in a straight line, and thus guarding against the beginning of jackknife, the tendency can be effectively overcome. By preventing the jackknifing or turning at the start, I can accomplish with a relatively small force a result which would be almost impossible to accomplish at a later point in the jackknife.

It is true that the anti-jacknife device will not operate if the vehicle train is turning through a substantial angle at the time the brakes are applied. However, the danger of driving on a curving road which is wet or icy is an obvious one and one which the driver must compensate for. The unexpected, and therefore most treacherous, jackknife occurs when the vehicles are moving in a substantially straight line, and the driver, in view of this, has developed a fairly high speed. It will be noted that the tapered arrangement of the plunger is such as to tend to center the trailer even though it may have moved a few degrees to one side or the other, but not enough to prevent the tip of the plunger from entering the large end of the opening in the upper fifth wheel plate.

Figure 4 shows a modified arrangement in which a device is used to clamp the upper and lower fifth wheel plates together, and thereby resist relative rotation of the plates. The device, which is shown diagrammatically, may comprise an arm 66 secured to the lower fifth wheel plate 20, and a lever 68 pivoted at 70 on the arm 66 and having a portion 72 adapted to exert a downward force on the upper fifth wheel plate 24 tending to clamp the plates together. The lever 68 may be operated by any desired means. It may be controlled by direct manual application, or it may be controlled by a power device 74, as shown. The power device 74 may in turn be controlled manually, or may be caused to operate automatically whenever the brakes are applied, as in the preceding embodiment. The operation of this device is generally similar to that of the preceding embodiment, except that the friction creating force takes the place of the force exerted on the plunger or latch.

Although particular embodiments of my invention have been described, it will be understood by those skilled in the art that the object of the invention may be attained by the use of constructions different in certain respects from those disclosed without departing from the underlying principles of the invention. I therefore desire by the following claims to include within the scope of my invention all such variations and modifications by which substantially the results of my invention may be obtained through the use of substantially the same or equivalent means.

I claim:

1. For use in a tractor-trailer vehicle combination having steering mechanism on the tractor, a kingpin transmitting motive force from the tractor to the trailer and serving as a pivot for relative turning movement of the tractor and trailer, an upper fifth wheel on the trailer having an opening therein, and a lower fifth wheel on the tractor operatively associated with the upper fifth wheel and having an opening therethrough aligned with the opening in the upper fifth wheel when the tractor and trailer are in a substantially straight line; a device for preventing jackknifing of the tractor-trailer vehicle combination comprising a plunger normally extending into the opening in the lower fifth wheel but not into the opening in the upper fifth wheel, and means for moving said plunger into the opening in the upper fifth wheel to resist relative turning movement of the upper and lower fifth wheels and thereby resist relative turning movement of the tractor and trailer, the bottom surface of the opening in the upper fifth wheel being formed to act as a cam in order that force tending to cause relative turning movement of the tractor and trailer whenever the steering mechanism of the tractor is operated to select a different direction of movement may force the plunger out of engagement with the upper fifth wheel.

2. In a tractor-trailer vehicle combination having brakes, a kingpin transmitting motive force from the tractor to the trailer and serving as a pivot for relative turning movement of the tractor and trailer, an upper fifth wheel plate on the trailer having an opening spaced from the kingpin a predetermined radial distance, and a lower fifth wheel plate on the tractor in engagement with the upper fifth wheel plate, means for preventing jackknifing of the tractor-trailer vehicle combination comprising a plunger mounted in the lower fifth wheel plate and in alignment with the opening in the upper fifth wheel plate when the tractor and trailer are in a straight line or within a few degrees thereof, mechanism for exerting a force on said plunger to move it into opening in the upper fifth wheel plate to thereby resist relative turning movement of the tractor and trailer about the kingpin pivot, a power device operating said mechanism, valve means controlling said power device, and means regulating said valve means to cause the plunger to tend to move into the opening in the upper fifth wheel plate whenever the tractor-trailer brakes are applied, the inner surface of the opening in the upper fifth wheel plate and the end surface of the plunger being tapered to permit the tractor steering mechanism to override the jackknife preventing means and force the plunger out of engagement with the upper fifth wheel plate whenever the operator desires to turn the tractor and trailer.

3. For use in a tractor-trailer combination having an operator operated brake control member on the tractor, and relatively rotatable elements associated respectively with the trailer and the tractor; means for preventing jackknifing of the trailer comprising a conical opening formed in the element associated with the trailer, a plunger guided by the element associated with the tractor and movable longitudinally toward or away from the aforementioned conical opening, said plunger being aligned with said conical opening when the tractor and trailer are moving in the same direction, said plunger having a conical end portion adapted to enter said opening and thereby resist relative rotational movement of said relatively rotatable elements, thus tending to hold the tractor and trailer in a straight-line relationship, the conical shape of the plunger end and of the opening serving both to enable the plunger to enter the opening in spite of slight misalignment and also to permit an unusually strong force to overrule the locking effect of the plunger and force it out of the opening, a lever acting on said plunger, a power cylinder having a pressure responsive movable element which actuates said lever, valve means controlling said power cylinder, electromagnetic means arranged to operate said valve means, and an electrical circuit controlling said electromagnetic means including a switch actuated by the operator operated brake control member.

4. For use in a tractor-trailer combination having an operator operated brake control member on the tractor, and relatively rotatable elements associated respectively with the trailer and the tractor, the upper of said elements being associated with the trailer and the lower of said elements being associated with the tractor; means for preventing jackknifing of the trailer comprising a conical opening formed in the element associated with the trailer, a vertically movable plunger guided by the element associated with the tractor and movable toward or away from the aforementioned conical opening, said plunger being aligned with said conical opening when the tractor and trailer are moving in the same direction, said plunger having a conical end portion adapted to enter said opening and thereby resist relative rotational movement of said relatively rotatable elements, thus tending to hold the tractor and trailer in a straight-line relationship, the conical shape of the plunger end and of the opening serving both to enable the plunger to enter the opening in spite of slight misalignment and also to permit an unusually strong force to overrule the locking effect of the plunger and force it out of the opening, a lever adapted to lift the plunger into engagement with the conical opening, a power cylinder having a pressure responsive movable element which actuates said lever, valve means controlling said power cylinder, electromagnetic means arranged to operate said valve means, and an electrical circuit controlling said electromagnetic means including a switch actuated by the operator operated brake control member.

5. For use in a tractor-trailer combination having an operator operated brake control member on the tractor, and relatively rotatable elements associated respectively with the trailer and the tractor; means for preventing jackknifing of the trailer comprising a conical opening formed in the element associated with the trailer, a plunger guided by the element associated with the tractor and movable longitudinally toward or away from the aforementioned conical opening, said plunger being aligned with said conical opening when the tractor and trailer are moving in the same direction, said plunger having a conical end portion adapted to enter said opening and thereby resist relative rotational movement of said relatively rotatable elements, thus tending to hold the tractor and trailer in a straight-line relationship, the conical shape of the plunger end and of the opening serving both to enable the plunger to enter the opening in spite of slight misalignment and also to permit an unusually strong force to overrule the locking effect of the plunger and force it out of the opening, and means under the control of the operator operated brake control member for actuating the plunger to cause its engagement with the conical opening.

6. For use in a tractor-trailer combination having an operator operated brake control member on the tractor, and relatively rotatable elements associated respectively with the trailer and the tractor; means for preventing jackknifing of the trailer comprising a conical opening formed in the element associated with the trailer, a plunger guided by the element associated with the tractor and movable longitudinally toward or away from the aforementioned conical opening, said plunger being aligned with said conical opening when the tractor and trailer are moving in the same direction, said plunger having a conical end portion adapted to enter said opening and thereby resist relative rotational movement of said relatively rotatable elements, thus tending to hold the tractor and trailer in a straight-line relationship, the conical shape of the plunger end and of the opening serving both to enable the plunger to enter the opening in spite of slight misalignment and also to permit an unusually strong force to overrule the locking effect of the plunger and force it out of the opening, a power cylinder having a pressure responsive movable element which actuates said plunger, valve means controlling said power cylinder, electromagnetic means arranged to operate said valve means, and an electrical circuit controlling said electromagnetic means including a switch actuated by the operator operated brake control member.

7. For use in a tractor-trailer combination having an operator operated brake control member on the tractor, and relatively rotatable elements associated respectively with the trailer and the tractor; means for preventing jackknifing of the trailer comprising an opening formed in the element associated with the trailer, a plunger guided by the element associated with the tractor and movable longitudinally into or out of the aforementioned opening, said plunger being aligned with said opening when the tractor and trailer are moving in the same direction, said plunger having an end portion adapted to enter said opening and thereby resist relative rotational movement of said relatively rotatable elements, thus tending to hold the tractor and trailer in a straight-line relationship, a power cylinder having a pressure responsive movable element which actuates said plunger, valve means controlling said power cylinder, electromagnetic means arranged to operate said valve means, and an electrical circuit controlling said electromagnetic means including a switch actuated by the operator operated brake control member.

8. For use in a tractor-trailer combination having an operator operated brake control member on the tractor, and relatively rotatable elements associated respectively with the trailer and the tractor; means for preventing jackknifing of the trailer comprising a conical opening formed in the element associated with the trailer, and a plunger guided by the element associated with the tractor and movable longitudinally toward or away from the aforementioned conical opening, said plunger being aligned with said conical opening when the tractor and trailer are moving in the same direction, said plunger having a conical end portion adapted to enter said opening and thereby resist relative rotational movement of said relatively rotatable elements, thus tending to hold the tractor and trailer in a straight-line relationship, the conical shape of the plunger end and of the opening serving both to enable the plunger to enter the opening in spite of slight misalignment and also to permit an unusually strong force to overrule the locking effect of the plunger and force it out of the opening.

9. For use in a tractor-trailer vehicle combination having steering mechanism on the tractor, a pivotal connecting member transmitting motive force from the tractor to the trailer and serving as a pivot for relative turning movement of the tractor and trailer, an upper fifth wheel on the trailer, and a lower fifth wheel on the tractor operatively associated with the upper fifth wheel; a device for preventing jackknifing of the tractor-trailer vehicle combination comprising a plunger carried by one of said fifth wheels, the other of said fifth wheels having an opening therein which is aligned with said plunger when the tractor and trailer are in a substantially straight line, and means for moving said plunger into said opening to resist relative turning movement of the upper and lower fifth wheels and thereby resist relative turning movement of the tractor and trailer, the inner surface of said opening being formed to act as a cam in order that force tending to cause relative turning movement of the tractor and trailer whenever the steering mechanism of the tractor is operated to select a different direction of movement may force the plunger out of engagement with the fifth wheel having the opening.

10. For use in a tractor-trailer vehicle combination having steering mechanism on the tractor, and a pivotal connecting member transmitting motive force from the tractor to the trailer and serving as a pivot for relative turning movement of the tractor and trailer; a device for preventing jackknifing of the tractor-trailer vehicle combination comprising a plunger carried by one of said vehicles, the other of said vehicles having a member provided with an opening which is aligned with said plunger when the tractor and trailer are in a substantially straight line, and means for moving said plunger into said opening to resist relative turning movement of the tractor and trailer, the inner surface of said opening being formed to act as a cam in order that force tending to cause relative turning movement of the tractor and trailer whenever the steering mechanism of the tractor is operated to select a different direction of movement may force the plunger out of engagement with said opening.

EARL R. PRICE.

REFERENCES CITED

The following references are of record in the file of this patent:

UNITED STATES PATENTS

| Number | Name | Date |
|---|---|---|
| 1,374,352 | Borst | Apr. 12, 1921 |
| 2,188,727 | Soulis | Jan. 30, 1940 |
| 2,213,221 | Johnson | Sept. 3, 1940 |